United States Patent
Satake et al.

(10) Patent No.: US 11,008,417 B2
(45) Date of Patent: May 18, 2021

(54) URETHANE RESIN COMPOSITION, COATING AGENT, AND ARTICLE

(71) Applicant: DIC Corporation, Tokyo (JP)

(72) Inventors: Naoto Satake, Osaka (JP); Junichi Miyake, Osaka (JP); Sadamu Nagahama, Osaka (JP)

(73) Assignee: DIC CORPORATION, Tokyo (JP)

( * ) Notice: Subject to any disclaimer, the term of this patent is extended or adjusted under 35 U.S.C. 154(b) by 157 days.

(21) Appl. No.: 16/087,401

(22) PCT Filed: Mar. 14, 2017

(86) PCT No.: PCT/JP2017/010131
§ 371 (c)(1),
(2) Date: Sep. 21, 2018

(87) PCT Pub. No.: WO2017/164002
PCT Pub. Date: Sep. 28, 2017

(65) Prior Publication Data
US 2020/0172656 A1  Jun. 4, 2020

(30) Foreign Application Priority Data
Mar. 25, 2016 (JP) .............................. JP2016-061854

(51) Int. Cl.
| | | |
|---|---|---|
| *C08G 18/68* | (2006.01) | |
| *C08G 18/12* | (2006.01) | |
| *C08G 18/32* | (2006.01) | |
| *C08G 18/42* | (2006.01) | |
| *C08G 18/44* | (2006.01) | |
| *C08G 18/48* | (2006.01) | |
| *C08G 18/66* | (2006.01) | |
| *C08G 18/75* | (2006.01) | |
| *C09D 175/04* | (2006.01) | |
| *C08G 18/08* | (2006.01) | |
| *C08G 18/10* | (2006.01) | |
| *C09D 175/16* | (2006.01) | |
| *C08G 18/67* | (2006.01) | |
| *C08F 290/14* | (2006.01) | |
| *C09D 175/14* | (2006.01) | |

(52) U.S. Cl.
CPC ............ *C08G 18/68* (2013.01); *C08F 290/14* (2013.01); *C08F 290/147* (2013.01); *C08G 18/0823* (2013.01); *C08G 18/10* (2013.01); *C08G 18/12* (2013.01); *C08G 18/3206* (2013.01); *C08G 18/42* (2013.01); *C08G 18/44* (2013.01); *C08G 18/4858* (2013.01); *C08G 18/66* (2013.01); *C08G 18/664* (2013.01); *C08G 18/6607* (2013.01); *C08G 18/675* (2013.01); *C08G 18/758* (2013.01); *C09D 175/04* (2013.01); *C09D 175/14* (2013.01); *C09D 175/16* (2013.01)

(58) Field of Classification Search
CPC .. C08G 18/68; C08G 18/758; C08G 18/6607; C08G 18/3206; C08G 18/12; C08G 18/44; C08G 18/664; C08G 18/42; C08G 18/4858; C08G 18/0823; C08G 18/10; C08G 18/675; C08G 18/66; C09D 175/04; C09D 175/16; C09D 175/14; C08F 290/14; C08F 290/147
See application file for complete search history.

(56) References Cited

U.S. PATENT DOCUMENTS

2016/0053146 A1 * 2/2016 Miyake .................. C09J 175/06
524/591

FOREIGN PATENT DOCUMENTS

| JP | 2015-157962 A | 9/2015 |
| WO | WO 2014/156423 | * 10/2014 |

OTHER PUBLICATIONS

Machine English translation of JP 2015-157962, Haruna et al., Sep. 3, 2015.*
Odian, G., Principles of Polymerization, Third Edition, 1991, pp. 19-24.*
International Search Report issued in corresponding International Patent Application No. PCT/JP2017/010131, dated Jun. 6, 2017, with English Translation.

* cited by examiner

*Primary Examiner* — Patrick D Niland
(74) *Attorney, Agent, or Firm* — McDermott Will & Emery LLP

(57) ABSTRACT

The present invention uses a urethane resin composition including a urethane resin (A), a multifunctional acrylate (B), and a solvent (C). The urethane resin (A) is a reaction product of a polyol (a1) and a polyisocyanate (a2). The polyol (a1) includes an alkylene diol (a1-1) having two or more polymerizable unsaturated groups and represented by general formula (1) or an oxyalkylene diol (a1-2) having two or more polymerizable unsaturated groups and represented by general formula (2) below. The proportion of polymerizable unsaturated bonds in the urethane resin composition is within a range of 3 to 9 mmol/g. The urethane resin composition is a urethane resin composition that can form a coating film having excellent hardness, scratch resistance, and flexibility.

$$HO-R^1-OH \quad (1)$$

$$HO-R^1O-R^2-OR^3-OH \quad (2)$$

15 Claims, No Drawings

URETHANE RESIN COMPOSITION, COATING AGENT, AND ARTICLE

CROSS REFERENCE TO RELATED APPLICATIONS

This application is the U.S. National Phase under 35 U.S.C. § 371 of International Application No. PCT/JP2017/010131, filed on Mar. 14, 2017, which claims the benefit of Japanese Application No. 2016-061854, filed on Mar. 25, 2016, the entire contents of each are hereby incorporated by reference.

TECHNICAL FIELD

The present invention relates to a urethane resin composition that can be used for various applications, for example, in a coating agent and in an adhesive.

BACKGROUND ART

Urethane resin compositions typically have good adhesion to a substrate and can form a soft coating film and are thus used for various applications, such as in a coating agent and in an adhesive.

One known urethane resin composition is, for example, an aqueous polyurethane dispersion obtained by reacting a mixture containing a) at least one organic aliphatic, alicyclic, or aromatic di-, tri-, or poly-isocyanate; b) at least one isocyanate-reactive polycarbonate diol, triol, or polyol; c) at least one compound having at least one isocyanate-reactive group and at least one free-radical polymerizable unsaturated group; and d) at least one compound having at least one isocyanate-reactive group and at least one dispersing active group, and optionally containing e) at least one compound having at least two isocyanate-reactive groups and having a molecular weight of less than 1000 g/mol, preferably less than 500 g/mol, and then dispersing the resulting reaction product in water (see, for example, PTL 1).

Studies have been conducted on using a urethane resin composition, for example, for surface coatings of optical members, such as flexible displays. However, coating films formed from the above-described aqueous polyurethane dispersion are insufficient in terms of pliability, such as elongation and flexibility, and thus may exhibit, for example, blushing when the coated article is bent. In addition, coating films formed from the aqueous polyurethane dispersion are insufficient in terms of hardness and are thus susceptible to scratches when, for example, used as a surface coating agent for a touch panel or the like, which may result in poor appearance, for example.

CITATION LIST

Patent Literature

PTL 1: Japanese Unexamined Patent Application Publication (Translation of PCT Application) No. 2008-534710

SUMMARY OF INVENTION

Technical Problem

An object of the present invention is to provide a urethane resin composition that can form a coating film having excellent hardness, scratch resistance, and flexibility.

Solution to Problem

The present inventors diligently performed studies to solve the problems described above and consequently found that the problems can be solved by using a urethane resin composition containing a urethane resin (A) and a multifunctional acrylate (B), with the urethane resin (A) being formed by using, as a polyol, which is a material of the urethane resin, an alkylene diol (a1-1) having one to nine carbon atoms and having two or more polymerizable unsaturated groups or an oxyalkylene diol (a1-2) having one to five carbon atoms and having two or more polymerizable unsaturated groups. Accordingly, the present invention was accomplished.

That is, the present invention relates to a urethane resin composition including a urethane resin (A), a multifunctional acrylate (B), and a solvent (C). The urethane resin (A) is a reaction product of a polyol (a1) and a polyisocyanate (a2). The polyol (a1) includes an alkylene diol (a1-1) having two or more polymerizable unsaturated groups and represented by general formula (1) below or an oxyalkylene diol (a1-2) having two or more polymerizable unsaturated groups and represented by general formula (2) below. In the urethane resin composition, the proportion of polymerizable unsaturated bonds in the total of the urethane resin (A) and the multifunctional acrylate (B) is within a range of 2.5 to 9.5 mmol/g.

[Chem. 1]

$$\text{HO}-\text{R}^1-\text{OH} \quad (1)$$

In general formula (1), $R^2$ is a structure in which two or more functional groups containing a polymerizable unsaturated group are present in side chains of a linear alkylene group having one to nine carbon atoms.

[Chem. 2]

$$\text{HO}-\text{R}^1\text{O}-\text{R}^2-\text{OR}^3-\text{OH} \quad (2)$$

In general formula (2), $R^2$ and $R^3$ are each a structure in which a functional group containing a polymerizable unsaturated group is present in a side chain of an ethylene group. $R^2$ is an alkylene group having 1 to 5 carbon atoms.

Advantageous Effects of Invention

The urethane resin composition of the present invention can form a coating film having excellent hardness, scratch resistance, and flexibility and is therefore suitable for use as a coating agent and an adhesive for plastic substrates formed from, for example, an acrylonitrile-butadiene-styrene resin (ABS resin), a polycarbonate resin (PC resin), an ABS/PC resin, a polystyrene resin (PS resin), a polymethacrylate resin (PMMA resin), or a polyester resin (PET resin).

DESCRIPTION OF EMBODIMENTS

A urethane resin composition of the present invention includes a urethane resin (A), a multifunctional acrylate (B), and a solvent (C). The urethane resin (A) is a reaction product of a polyol (a1) and a polyisocyanate (a2). The polyol (a1) includes an alkylene diol (a1-1) having two or more polymerizable unsaturated groups and represented by general formula (1) below or an oxyalkylene diol (a1-2) having two or more polymerizable unsaturated groups and represented by general formula (2) below.

The urethane resin (A) is a urethane resin having polymerizable unsaturated groups, specifically, a reaction product of the polyol (a1) and the polyisocyanate (a2), with the polyol (a1) including the alkylene diol (a1-1) having two or more polymerizable unsaturated groups and represented by general formula (1) below or the oxyalkylene diol (a1-2) having two or more polymerizable unsaturated groups and represented by general formula (2) below.

[Chem. 3]

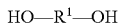 (1)

In general formula (1), $R^2$ is a structure in which two or more functional groups containing a polymerizable unsaturated group are present in side chains of a linear alkylene group having one to nine carbon atoms.

[Chem. 4]

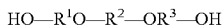 (2)

In general formula (2), $R^2$ and $R^3$ are each a structure in which a functional group containing a polymerizable unsaturated group is present in a side chain of an ethylene group. $R^2$ is an alkylene group having 1 to 5 carbon atoms.

The polyol (a1) used to produce the urethane resin (A) is a polyol including the alkylene diol (a1-1) having two or more polymerizable unsaturated groups and represented by general formula (1) or the oxyalkylene diol (a1-2) having two or more polymerizable unsaturated groups and represented by general formula (2). This is intended to incorporate two or more polymerizable unsaturated groups into side chains of the backbone of the urethane resin (A), where the urethane bonds are primarily present. The polymerizable unsaturated groups derived from the alkylene diol (a1-1) or the oxyalkylene diol (a1-2) undergo radical polymerization during formation of, for example, a coating film. This enables the formation of a coating film having excellent hardness, elongation, and flexibility.

The alkylene diol (a1-1) may be an alkylene diol having a structure represented by general formula (1). $R^1$ in general formula (1) is a structure in which two or more functional groups containing a polymerizable unsaturated group are present in side chains of a linear alkylene group having one to nine carbon atoms. For example, in the case of pentaerythritol di(meth)acrylate, $R^1$ in general formula (1) is a structure in which two functional groups containing a polymerizable unsaturated group are present in side chains of a propylene group, which has three carbon atoms.

It is preferable that the alkylene diol (a1-1) be an alkylene diol having two or more and five or less polymerizable unsaturated groups. It is more preferable that the alkylene diol (a1-1) be an alkylene diol having two or more and three or less polymerizable unsaturated groups so that a urethane resin composition that can form a coating film having excellent hardness, elongation, and flexibility can be obtained.

Examples of the alkylene diol (a1-1) include pentaerythritol di(meth)acrylate [dimethylolpropane di(meth)acrylate], dimethylolmethane di(meth)acrylate ($R^1$ in general formula (1) has three carbon atoms and has two functional groups containing a polymerizable unsaturated group), diethylolmethane di(meth)acrylate, diethylolpropane di(meth)acrylate ($R^1$ in general formula (1) has five carbon atoms and has two functional groups containing a polymerizable unsaturated group), dipropanolmethane di(meth)acrylate, dipropanolpropane di(meth)acrylate ($R^1$ in general formula (1) has seven carbon atoms and has two functional groups containing a polymerizable unsaturated group), dibutanolmethane di(meth)acrylate, and dibutanolpropane di(meth)acrylate ($R^1$ in general formula (1) has nine carbon atoms and has two functional groups containing a polymerizable unsaturated group). In particular, pentaerythritol di(meth)acrylate or dimethylolmethane di(meth)acrylate is more preferable so that a urethane resin composition that can form a coating film having excellent hardness, elongation, and flexibility can be obtained. These alkylene diols (a1-1) may be used alone or in a combination of two or more. In the present invention, "(meth)acrylate" refers to one or both of acrylate and methacrylate.

The oxyalkylene diol (a1-2) may be an alkylene diol having a structure represented by general formula (2). $R^2$ and $R^3$ in general formula (2) are each a structure in which a functional group containing a polymerizable unsaturated group is present in a side chain of an ethylene group. In general formula (2), there is a total of two or more such structures, in which a functional group containing a polymerizable unsaturated group is present in a side chain of an ethylene group. It is preferable that two or more and five or less such structures be present, and it is more preferable that two or more and three or less such structures be present.

$R^2$ in general formula (2) is an alkylene group having one to five carbon atoms, examples of which include methylene groups, ethylene groups, propylene groups, butylene groups, and pentyl groups.

Examples of the oxyalkylene diol (a1-2) include bis(3-acryloyloxy-2-hydroxypropoxy)methane ($R^1$ and $R^3$ in general formula (2) each have two carbon atoms and a functional group containing a polymerizable unsaturated group, and $R^2$ has one carbon atom), 1,2-bis(3-acryloyloxy-2-hydroxypropoxy)ethane ($R^1$ and $R^3$ in general formula (2) each have two carbon atoms and a functional group containing a polymerizable unsaturated group, and $R^2$ has two carbon atoms), 1,3-bis(3-acryloyloxy-2-hydroxypropoxy)propane ($R^1$ and $R^3$ in general formula (2) each have two carbon atoms and a functional group containing a polymerizable unsaturated group, and $R^2$ has three carbon atoms), 1,4-bis(3-acryloyloxy-2-hydroxypropoxy)butane ($R^1$ and $R^3$ in general formula (2) each have two carbon atoms and a functional group containing a polymerizable unsaturated group, and $R^2$ has four carbon atoms), and 1,5-bis(3-acryloyloxy-2-hydroxypropoxy)pentane ($R^1$ and $R^3$ in general formula (2) each have two carbon atoms and a functional group containing a polymerizable unsaturated group, and $R^2$ has five carbon atoms). In particular, 1-4-bis(3-acryloyloxy-2-hydroxypropoxy)butane is more preferable because a urethane resin composition that can form a coating film having excellent hardness, elongation, and flexibility can be obtained. These oxyalkylene diols (a1-2) may be used alone or in a combination of two or more.

It is preferable that the alkylene diol (a1-1) or the oxyalkylene diol (a1-2) be present in a total amount in a range of 0.1 to 49 mass % of the total amount of the materials used to produce the urethane resin (A) so that a urethane resin composition that can form a coating film having excellent hardness, elongation, and flexibility can be obtained. It is more preferable that the range be 1 to 15 mass %. The total amount of the materials used to produce the urethane resin (A) is equal to the total mass of the polyol (a1), the polyisocyanate (a2), and, if used, a chain extender.

Polyols (a1) that can be used to produce the urethane resin (A) include the alkylene diol (a1-1) and the oxyalkylene diol (a1-2), and these may be used in a combination with one or more other polyols as necessary.

The one or more other polyols may be a polyol having an aromatic ring and/or a polyol having a sulfur atom. The purpose of using such a polyol is to impart high refractive index properties to coating films formed from the urethane resin composition of the present invention.

Examples of the polyol having an aromatic ring include aromatic polyester polyols, aromatic polycarbonate polyols, aromatic polyether polyols, and alkylene oxide adducts of bisphenol. These polyols having an aromatic ring may be used alone or in a combination of two or more.

The alkylene oxide adduct of bisphenol is an adduct in which an alkylene oxide is added to a phenolic hydroxyl group of the bisphenol. Examples of the alkylene oxide adduct of bisphenol include alkylene oxide adducts of bisphenol A, alkylene oxide adducts of bisphenol F, and alkylene oxide adducts of bisphenol S. Examples of the alkylene oxide include ethylene oxides and propione oxides.

Furthermore, the one or more other polyols include polyols having a sulfur atom in addition to polyols having an aromatic ring.

Examples of the polyol having a sulfur atom include bis(2-hydroxyethyl)sulfide and 2,5-dihydroxy-1,4-dithiane.

Furthermore, examples of the one or more other polyols include, in addition to polyols having an aromatic ring and polyols having a sulfur atom, polyols having a hydrophilic group. The purpose of using such a polyol is to impart excellent dispersion stability in water to the urethane resin (A).

Examples of the polyol having a hydrophilic group include polyols having an anionic group, polyols having a cationic group, and polyols having a nonionic group. In particular, polyols having an anionic group are preferable.

Examples of the polyol having an anionic group include polyols having a carboxyl group and polyols having a sulfonic acid group.

Examples of the polyol having a carboxyl group include 2,2-dimethylolpropionic acid, 2,2-dimethylolbutanoic acid, and 2,2-dimethylolvaleric acid. In particular, 2,2-dimethylolpropionic acid is preferable. It is possible to use a polyester polyol having a carboxyl group obtained by reacting the above-mentioned polyol having a carboxyl group with any of a variety of polycarboxylic acids.

Examples of the polyol having a sulfonic acid group include dicarboxylic acids, such as 5-sulfoisophthalic acid, sulfoterephthalic acid, 4-sulfophthalic acid, and 5-(4-sulfophenoxy)isophthalic acid, and salts thereof; polyester polyols obtained by reacting such a dicarboxylic acid with a low-molecular-weight polyol, such as ethylene glycol, propylene glycol, 1,4-butanediol, 1,6-hexanediol, diethylene glycol, and neopentyl glycol; and polyester polyols obtained by reacting such a polyester polyol with a cyclic ester, such as γ-butyrolactone, δ-valerolactone, and ε-caprolactone.

It is preferable that some or all of the anionic groups be neutralized with, for example, a basic compound so that good water dispersibility can be exhibited.

Examples of the basic compound that may be used to neutralize the anionic group include ammonia, triethylamine, morpholine, monoethanolamine, and organic amines having a boiling point of 200° C. or higher, such as diethylethanolamine; and metal hydroxides, such as sodium hydroxide, potassium hydroxide, and lithium hydroxide. It is preferable that the basic compound be used in a range of a ratio [basic compound/(total amount of acidic groups such as carboxyl groups)] of 0.5 to 3 (molar ratio) so that the dispersion stability in water of the resulting urethane resin composition can be improved. It is more preferable that the range be 0.7 to 1.5 (molar ratio).

Examples of the polyol having a cationic group include polyols having a tertiary amino group. Specific examples of the polyol include polyols having N-methyldiethanolamine and polyols obtained by reacting a compound having two epoxy groups with a secondary amine.

It is preferable that some or all of the cationic groups be neutralized with an acidic compound, examples of which include formic acid, acetic acid, propionic acid, succinic acid, glutaric acid, tartaric acid, adipic acid, and phosphoric acid.

It is preferable that some or all of the tertiary amino groups, which are cationic groups, be quaternized. Examples of an agent for the quaternization include dimethyl sulfate, diethyl sulfate, methyl chloride, and ethyl chloride. Dimethyl sulfate is preferable.

Examples of the polyol having a nonionic group include polyalkylene glycols having a structural unit derived from ethylene oxide.

It is preferable that the polyol having a hydrophilic group be present in an amount ranging from 1 to 20 mass % of the total amount of the materials used to produce the urethane resin (A). It is more preferable that the amount range from 1 to 15 mass % so that a urethane resin composition that can form a coating film having excellent hardness, elongation, and flexibility can be obtained.

Examples of the one or more other polyols include polyester polyols, polycarbonate polyols, and polyether polyols. With such a polyol, a coating film having excellent hardness, elongation, and flexibility can be formed. Among these, polyester polyols and polycarbonate polyols are preferable.

Examples of the polyester polyol include polyester polyols obtained by reacting a low-molecular-weight polyol with a polycarboxylic acid; polyester polyols obtained by the ring-opening polymerization reaction of a cyclic ester, such as ε-caprolactone; and polyester polyols obtained by copolymerizing any of these. These polyester polyols may be used alone or in a combination of two or more.

Examples of the low-molecular-weight polyol include aliphatic polyols having a molecular weight of approximately 50 to approximately 300, such as ethylene glycol, propylene glycol, 1,4-butanediol, 1,6-hexanediol, diethylene glycol, neopentyl glycol, and 1,3-butanediol; polyols having an alicyclic structure, such as cyclohexanedimethanol; and polyols having an aromatic structure, such as bisphenol A and bisphenol F. In particular, 1,6-hexanediol and neopentyl glycol are preferable.

Examples of the polycarboxylic acid that may be used to produce the polyester polyol include aliphatic polycarboxylic acids, such as succinic acid, adipic acid, sebacic acid, and dodecanedicarboxylic acid; aromatic polycarboxylic acids, such as terephthalic acid, isophthalic acid, phthalic acid, and naphthalene dicarboxylic acid; and anhydrides and esters thereof.

The polycarbonate polyol is a polycarbonate polyol obtained by esterifying a carbonic acid and a carbonic acid ester with a polyhydric alcohol. Examples of the polyhydric alcohol include 1,3-propanediol, 1,4-butanediol, 1,6-hexanediol, diethylene glycol, polyethylene glycol, polypropylene glycol, and polytetramethylene ether glycol. These polycarbonate polyols may be used alone or in a combination of two or more.

Examples of the polyether polyol include polyols obtained by addition-polymerizing an alkylene oxide with an initiator, which may be, for example, one or more compounds having two or more active hydrogen atoms. Examples of the compound having two or more active hydrogen atoms include propylene glycol, trimethylene glycol, 1,3-butanediol, 1,4-butanediol, 1,6-hexanediol, neopentyl glycol, glycerol, diglycerol, trimethylolethane, trimethylolpropane, water, and hexanetriol. Examples of the alkylene oxide include propylene oxide, butylene oxide, styrene oxide, epichlorohydrin, and tetrahydrofuran. These polyether polyols may be used alone or in a combination of two or more.

It is preferable that the polyester polyol, the polycarbonate polyol, and the polyether polyol be in an amount ranging from 1 to 70 mass % of the total amount of the materials used to produce the urethane resin (A). It is more preferable that the amount be in a range of 15 to 45 mass % so that a coating film having excellent hardness, elongation, and flexibility can be formed.

Examples of the polyisocyanate (a2) used to produce the urethane resin (A) include polyisocyanates having an alicyclic structure, such as cyclohexane diisocyanate, dicyclohexylmethane diisocyanate, and isophorone diisocyanate; aromatic polyisocyanates, such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and naphthalene diisocyanate; and aliphatic polyisocyanates, such as hexamethylene diisocyanate, lysine diisocyanate, xylylene diisocyanate, and tetramethylxylylene diisocyanate. In particular, an aromatic polyisocyanate is preferable so that a coating film having excellent hardness, elongation, and flexibility can be formed. These polyisocyanates (a2) may be used alone or in a combination of two or more.

Examples of methods for producing the urethane resin (A), which is obtained by reacting the polyol (a1) with the polyisocyanate (a2), include a method in which the polyol (a1) is mixed with the polyisocyanate (a2) in the absence of a solvent or in the presence of an organic solvent and then the mixture is reacted at a reaction temperature ranging from approximately 50° C. to approximately 150° C.

It is preferable that the reaction of the polyol (a1) with the polyisocyanate (a2) be carried out in such a manner that the equivalent ratio of the isocyanate groups of the polyisocyanate (a2) to the hydroxyl groups of the polyol (a1) be in a range of 0.8 to 2.5, for example. It is more preferable that the ratio be in a range of 0.9 to 1.5.

In the production of the urethane resin (A), a chain extender may be used as necessary in addition to the polyol (a1) and the polyisocyanate (a2) so that a coating film having excellent hardness, elongation, and flexibility can be formed.

Examples of the chain extender that may be used to produce the urethane resin (A) include polyamines, hydrazine compounds, and other active hydrogen atom-containing compounds.

Examples of the polyamine include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, and triethylenetetramine. These polyamines may be used alone or in a combination of two or more.

Examples of the hydrazine compound include hydrazine, N,N'-dimethylhydrazine, 1,6-hexamethylenebishydrazine, succinic acid dihydrazide, adipic acid dihydrazide, glutaric acid dihydrazide, sebacic acid dihydrazide, isophthalic acid dihydrazide, and β-semicarbazidopropionic acid hydrazide. These hydrazine compounds may be used alone or in a combination of two or more.

Examples of other active hydrogen-containing compounds include glycols, such as ethylene glycol, diethylene glycol, triethylene glycol, propylene glycol, 1,3-propanediol, 1,3-butanediol, 1,4-butanediol, hexamethylene glycol, sucrose, methylene glycol, glycerol, and sorbitol; phenols, such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water. These may be used alone or in a combination of two or more to such an extent that the storage stability of the urethane resin composition of the present invention does not decrease.

Examples of organic solvents that may be used to produce the urethane resin (A) include ketone solvents, such as acetone and methyl ethyl ketone; ether solvents, such as tetrahydrofuran and dioxane; acetate solvents, such as ethyl acetate and butyl acetate; nitrile solvents, such as acetonitrile; and amide solvents, such as dimethylformamide and N-methylpyrrolidone. These organic solvents may be used alone or in a combination of two or more.

To ensure safety and reduce the environmental impact, the organic solvent may be removed partially or wholly by, for example, evaporation under reduced pressure during or after the production of the urethane resin (A).

It is preferable that the urethane resin (A), obtained by using the method described above, have a weight average molecular weight ranging from 10,000 to 500,000 so that a coating film having excellent hardness, elongation, and flexibility can be formed. It is more preferable that the urethane resin (A) have a weight average molecular weight ranging from 20,000 to 200,000, and it is even more preferable that the urethane resin (A) have a weight average molecular weight ranging from 40,000 to 100,000.

It is preferable that the urethane resin (A) have urea bonds so that a coating film having excellent hardness, elongation, and flexibility can be formed.

It is preferable that the urethane resin (A) have a urea bond equivalent ranging from 500 to 50000 so that a coating film having excellent hardness, elongation, and flexibility can be formed.

Examples of the multifunctional acrylate (B) used in the present invention include pentaerythritol tetra(meth)acrylate, ditrimethylolpropane tetra(meth)acrylate, dipentaerythritol penta(meth)acrylate, dipentaerythritol hexa(meth)acrylate, trimethylol ethylene oxide-modified triacrylate, diglycerol ethylene oxide-modified (meth)acrylate, trimethylolpropane tri(meth)acrylate, trimethylolpropane propylene oxide-modified triacrylate, pentaerythritol tri(meth)acrylate, isocyanuric acid ethylene oxide-modified triacrylate, glycerol tri(meth)acrylate, glycerol propoxy triacrylate, pentaerythritol ethylene oxide-modified tetraacrylate. With the use of any of these, a urethane resin composition that can form a coating film having even higher hardness can be obtained. In particular, dipentaerythritol penta(meth)acrylate is preferable. These multifunctional acrylates may be used alone or in a combination of two or more.

It is preferable that the proportion of the polymerizable unsaturated bonds in the multifunctional acrylate (B) be in a range of 4 to 12 mmol/g so that a coating film having excellent hardness, scratch resistance, and flexibility can be formed. It is more preferable that the proportion be in a range of 4.3 to 11.8 mmol/g.

It is preferable that the mass ratio of the multifunctional acrylate (B) to the urethane resin (A) [multifunctional acrylate (B)/urethane resin (A)] be in a range of 0.5 to 4 so that a coating film having excellent hardness, scratch resistance, and flexibility can be formed. It is more preferable that the mass ratio be in a range of 1.4 to 3.5.

It is preferable that the proportion of the polymerizable unsaturated bonds in the total of the urethane resin (A) and the multifunctional acrylate (B) be in a range of 2.5 to 9.5 mmol/g so that a coating film having excellent hardness, scratch resistance, and flexibility can be formed. It is more preferable that the proportion be in a range of 3.5 to 9 mmol/g, and it is even more preferable that the proportion be in a range of 4 to 8.5 mmol/g.

Examples of methods for producing a urethane resin composition of the present invention by dissolving or dispersing the urethane resin (A), obtained using the above-described method, and the multifunctional acrylate (B) in the solvent (C) include, in the case that the urethane resin (A) has hydrophilic groups, a method in which some or all of the hydrophilic groups are neutralized and then the neutralized product is mixed with the solvent (C).

Examples of the solvent (C) used in the present invention include water, water-miscible organic solvents, and mixtures thereof. Examples of the water-miscible organic solvent include alcohols, such as methanol, ethanol, n-propanol, and isopropanol; ketones, such as acetone and methyl ethyl ketone; polyalkylene glycols, such as ethylene glycol, diethylene glycol, and propylene glycol; alkyl ethers of a polyalkylene glycol; and lactams, such as N-methyl-2-pyrrolidone. In the present invention, it is possible to use water alone, a mixture of water and a water-miscible organic solvent, or a water-miscible organic solvent alone. In view of safety and environmental impact, it is preferable to use water alone or a mixture of water and a water-miscible organic solvent. The use of water alone is particularly preferable.

It is preferable that the urethane resin composition of the present invention, obtained using the method described above, include the urethane resin (A) and the multifunctional acrylate (B) in an amount ranging from 5 mass % to 85 mass % of the total amount of the urethane resin composition. It is more preferable that the amount be in a range of 15 mass % to 50 mass %. In addition, it is preferable that the urethane resin composition of the present invention, obtained using the method described above, include the solvent (C) in an amount ranging from 10 mass % to 90 mass % of the total amount of the urethane resin composition. It is more preferable that the amount be in a range of 45 mass % to 80 mass %.

The urethane resin composition may include one or more additives as necessary. Examples of the additive include film-forming agents, fillers, thixotropic agents, tackifiers, pigments, and antimicrobial agents. These additives may be used to such an extent that the object of the present invention is not impaired.

Examples of the film-forming agent include anionic surfactants (e.g., dioctyl sulfosuccinate sodium salt), hydrophobic nonionic surfactants (e.g., sorbitan monooleate), and silicone oil.

Examples of the thixotropic agent include fillers surface-treated with, for example, a fatty acid, a fatty acid metal salt, a fatty acid ester, a paraffin, a resin acid, a surfactant, or a polyacrylic acid, polyvinyl chloride powders, hydrogenated castor oils, fine silica powders, organic bentonites, and sepiolites.

Examples of the pigment include commonly known inorganic pigments and organic pigments.

Examples of the inorganic pigment include titanium oxide, antimony red, red iron oxide, cadmium red, cadmium yellow, cobalt blue, Prussian blue, ultramarine blue, carbon black, and graphite.

Examples of the organic pigment include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, and azo pigments. Two or more of these pigments may be used in combination. These pigments may be pigments that are surface-treated to be self-dispersible in an aqueous medium.

Examples of the antimicrobial agent include silver chloride, tolylfluanid, dichlofluanid, fluorofolpet, zinc pyrithione, methyl 2-benzimidazolecarboxylate, and 2-(4-thiazolyl)benzimidazole.

Examples of other additives include various additives, examples of which include reaction accelerators (e.g., metal reaction accelerators, metal salt reaction accelerators, and amine reaction accelerators), photopolymerization initiators, stabilizers (e.g., UV absorbers, antioxidants, and heat stabilizers), moisture scavengers (e.g., 4-para-toluenesulfonyl isocyanate), adsorbents (e.g., quicklime, hydrated lime, zeolites, and molecular sieves), tackifiers, antifoaming agents, and leveling agents.

Examples of the photopolymerization initiator include 1-hydroxycyclohexyl phenyl ketone, benzophenone, 2-hydroxy-2-methyl-1-phenylpropan-1-one, 2-benzyl-2-dimethylamino-1-(4-morpholinophenyl)-butanone-1,1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-[4-(methylthio)phenyl]-2-morpholinopropan-1-one, 2-dimethylamino-2-(4-methyl-benzyl)-1-(4-morpholin-4-yl-phenyl)-butan-1-one, oxy-phenyl-acetic acid 2-[2-oxo-2-phenyl-acetoxy-ethoxy]-ethyl ester, oxy-phenyl-acetic acid 2-[2-hydroxy-ethoxy]-ethyl ester, bis(2,6-dimethoxybenzoyl)-2,4,4-trimethylpentyl phosphine oxide, bis(2,4,6-trimethylbenzoyl)-phenyl phosphine oxide, and 2,4,6-trimethyl-benzoyl-diphenyl-phosphine oxide. These photopolymerization initiators may be used alone or in a combination of two or more.

The urethane resin composition of the present invention is suitable for use in, for example, a coating agent that can provide surface protection and a decorative feature for various types of substrates.

Examples of substrates that can be coated with the coating agent to have a coating film thereon include glass substrates, metal substrates, plastic substrates, paper, wood substrates, and fibrous substrates. Further examples include substrates having a porous structure, such as a urethane foam substrate.

Examples of plastic substrates include polycarbonate substrates, polyester substrates, acrylonitrile-butadiene-styrene substrates, polyacrylic substrates, polystyrene substrates, polyurethane substrates, epoxy resin substrates, polyvinyl chloride substrates, and polyamide substrates.

Examples of the metal substrate include coated steel sheets, such as galvanized steel sheets and aluminum-zinc-alloy-coated steel sheets, iron sheets, aluminum sheets, aluminum alloy sheets, electrical steel sheets, copper sheets, and stainless steel sheets.

The substrate, made of the material described above, may have a flat shape or may have a curved portion. The substrate may be a substrate made of fibers, such as a nonwoven fabric.

With the coating agent of the present invention, a coating film can be formed in the following manner, for example. The coating agent is applied directly to the surface of the substrate or to the surface of the substrate, including a primer layer or the like formed thereon in advance. Subsequently, after drying, radical polymerization is carried out with the polymerizable unsaturated double bond groups of the urethane resin (A) and the multifunctional acrylate (B).

Furthermore, a coating film that can be formed from the coating agent can be layered on the surface of a desired substrate in the following manner. The coating agent is applied to a release paper and then dried and cured to form a coating film on the surface of the release paper. Further, an adhesive or glue is applied to the coating film, and the resultant is bonded to a substrate made of fibers, such as a nonwoven fabric, and then the release paper is peeled away.

Examples of methods for applying the coating agent to a substrate include spray methods, curtain coater methods, flow coater methods, roll coater methods, brush coating methods, and dip coating methods.

Examples of methods for curing the coating agent include methods involving heating and methods involving irradiation with actinic radiation, such as UV radiation.

The method involving heating may be performed, for example, at a temperature of approximately 100° C. to approximately 150° C. for approximately 10 minutes to approximately 30 minutes, although depending on the type of radical polymerization initiator used, to promote radical polymerization and accomplish curing.

The method involving irradiation with actinic radiation may be a method involving, for example, if the radiation is UV radiation, using a known lamp, such as a xenon lamp, a xenon-mercury lamp, a metal halide lamp, a high-pressure mercury lamp, a low-pressure mercury lamp, and an LED lamp.

It is preferable that the actinic radiation be provided at a dose in a range of 50 mJ/cm$^2$ to 5000 mJ/cm$^2$. The dose is more preferably in a range of 100 mJ/cm$^2$ to 3000 mJ/cm$^2$ and particularly preferably in a range of 100 mJ/cm$^2$ to 1000 mJ/cm$^2$. The dose of UV irradiation is based on values obtained by measurement in a wavelength region of 300 to 390 nm, by using a UV checker UVR-N1 (manufactured by Japan Storage Battery Co., Ltd.).

The thickness of the coating film that can be formed from the coating agent of the present invention may be appropriately adjusted in accordance with, for example, the intended use of the substrate; however, it is preferable that the thickness be typically approximately 0.1 μm to approximately 100 μm.

Articles having, on the substrate, a coating film formed from the coating agent as described above can be used as an optical member, such as a liquid crystal display and a flexible display, any of a variety of types of plastic products, for example, for a cellular phone or a home appliance, and a metal product, for example, for an automotive exterior or a construction material.

EXAMPLE

The present invention will now be described specifically with reference to examples and comparative examples.

Example 1: Preparation of Urethane Resin Composition (1)

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polycarbonate polyol (polycarbonate polyol obtained by reacting 1,6-hexanediol and 1,5-pentanediol with diethyl carbonate, number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 50 parts by mass of dipentaerythritol hexaacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (1) having a non-volatile content of 35 mass % was obtained.

Example 2: Preparation of Urethane Resin Composition (2)

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polyester polyol (polyester polyol obtained by reacting 1,6-hexanediol and neopentyl glycol with adipic acid, number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 13.9 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 50 parts by mass of dipentaerythritol hexaacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (2) having a non-volatile content of 35 mass % was obtained.

Example 3: Preparation of Urethane Resin Composition (3)

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polytetramethylene ether glycol (number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 50 parts by mass of dipentaerythritol hexaacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (3) having a non-volatile content of 35 mass % was obtained.

Example 4: Preparation of Urethane Resin Composition (4)

In a 2-L four-neck flask equipped with a heater, a stirrer, a thermometer, and a reflux condenser were placed 61.5 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 43.4 parts by mass of a polycarbonate polyol (polycarbonate polyol obtained by reacting 1,6-hexanediol and 1,5-pentanediol with diethyl carbonate, number average molecular weight of 2000), 0.04 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 7.7 parts by mass of 2,2-dimethylolpropionic acid and 5.1 parts by mass of methyl ethyl ketone were added. These were reacted at 80° C. for approximately 5 hours.

Next, 800 parts by mass of methyl ethyl ketone was added to the four-neck flask, and this was cooled. After cooling, 185.7 parts by mass of dipentaerythritol hexaacrylate and 5.8 parts by mass of triethylamine were added.

Next, 21.5 parts by mass of a 10 mass % aqueous solution of isophoronediamine, which served as a chain extender, was added to the four-neck flask and reacted. Thus, a urethane resin composition (4) having a non-volatile content of 25 mass % was obtained.

Example 5: Preparation of Urethane Resin Composition (5)

In a 2-L four-neck flask equipped with a heater, a stirrer, a thermometer, and a reflux condenser were placed 61.5 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 43.4 parts by mass of a polycarbonate polyol (polycarbonate polyol obtained by reacting 1,6-hexanediol and 1,5-pentanediol with diethyl carbonate, number average molecular weight of 2000), 0.04 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 7.7 parts by mass of 2,2-dimethylolpropionic acid and 5.1 parts by mass of methyl ethyl ketone were added. These were reacted at 80° C. for approximately 5 hours.

Next, the four-neck flask was cooled with stirring. After cooling, 233.3 parts by mass of dipentaerythritol hexaacrylate and 5.8 parts by mass of triethylamine were added, and 524 parts by mass of ion-exchanged water was added dropwise thereto.

Next, 10.9 parts by mass of a 10 mass % aqueous solution of piperazine, which served as a chain extender, was added to the four-neck flask and reacted, and thereafter solvent removal was carried out under reduced pressure. Thus, a urethane resin composition (5) having a non-volatile content of 35 mass % was obtained.

Example 6: Preparation of Urethane Resin Composition (6)

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polycarbonate polyol (polycarbonate polyol obtained by reacting 1,6-hexanediol and 1,5-pentanediol with diethyl carbonate, number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 50 parts by mass of ditrimethylolpropane tetraacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (6) having a non-volatile content of 35 mass % was obtained.

Example 7: Preparation of Urethane Resin Composition (7)

In a 2-L four-neck flask equipped with a heater, a stirrer, a thermometer, and a reflux condenser were placed 61.5 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 43.4 parts by mass of a polycarbonate polyol (polycarbonate polyol obtained by reacting 1,6-hexanediol and 1,5-pentanediol with diethyl carbonate, number average molecular weight of 2000), 0.04 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 7.7 parts by mass of 2,2-dimethylolpropionic acid and 5.1 parts by mass of methyl ethyl ketone were added. These were reacted at 80° C. for approximately 5 hours.

Next, the four-neck flask was cooled with stirring. After cooling, 60 parts by mass of trimethylolpropane ethylene oxide-modified triacrylate and 8.7 parts by mass of triethylamine were added, and 524 parts by mass of ion-exchanged water was added dropwise thereto.

Next, 10.9 parts by mass of a 10 mass % aqueous solution of piperazine, which served as a chain extender, was added to the four-neck flask and reacted, and thereafter solvent removal was carried out under reduced pressure. Thus, a urethane resin composition (7) having a non-volatile content of 35 mass % was obtained.

Example 8: Preparation of Urethane Resin Composition (8)

In a 2-L four-neck flask equipped with a heater, a stirrer, a thermometer, and a reflux condenser were placed 23.7 parts by mass of methyl ethyl ketone, 8.2 parts by mass of pentaerythritol diacrylate (in general formula (1), $R^1$ has three carbon atoms, and there are two functional groups containing a polymerizable unsaturated group), 47.8 parts by mass of a polycarbonate polyol (polycarbonate polyol obtained by reacting 1,6-hexanediol and 1,5-pentanediol with diethyl carbonate, number average molecular weight of 2000), 2.2 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 50 parts by mass of dipentaerythritol hexaacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (8) having a non-volatile content of 35 mass % was obtained.

Example 9: Preparation of Urethane Resin Composition (9)

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polycarbonate polyol (polycarbonate polyol obtained by reacting 1,6-hexanediol and 1,5-pentanediol with diethyl carbonate, number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 30 parts by mass of dipentaerythritol hexaacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (9) having a non-volatile content of 35 mass % was obtained.

Example 10: Preparation of Urethane Resin Composition (10)

In a 2-L four-neck flask equipped with a heater, a stirrer, a thermometer, and a reflux condenser were placed 61.5 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 21.7 parts by mass of a polycarbonate polyol (polycarbonate polyol obtained by reacting 1,6-hexanediol and 1,5-pentanediol with diethyl carbonate, number average molecular weight of 2000), 21.7 parts by mass of polytetramethylene ether glycol (number average molecular weight of 2000), 0.04 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 7.7 parts by mass of 2,2-dimethylolpropionic acid and 5.1 parts by mass of methyl ethyl ketone were added. These were reacted at 80° C. for approximately 5 hours.

Next, the four-neck flask was cooled with stirring. After cooling, 185.7 parts by mass of dipentaerythritol hexaacrylate and 8.7 parts by mass of triethylamine were added, and 524 parts by mass of ion-exchanged water was added dropwise thereto.

Next, 10.9 parts by mass of a 10 mass % aqueous solution of piperazine, which served as a chain extender, was added to the four-neck flask and reacted, and thereafter solvent removal was carried out under reduced pressure. Thus, a urethane resin composition (10) having a non-volatile content of 35 mass % was obtained.

Example 11: Preparation of Urethane Resin Composition (11)

In a 2-L four-neck flask equipped with a heater, a stirrer, a thermometer, and a reflux condenser were placed 61.5 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 43.4 parts by mass of a polycarbonate polyol (polycarbonate polyol obtained by reacting 1,6-hexanediol and 1,5-pentanediol with diethyl carbonate, number average molecular weight of 2000), 0.04 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 7.7 parts by mass of 2,2-dimethylolpropionic acid and 5.1 parts by mass of methyl ethyl ketone were added. These were reacted at 80° C. for approximately 5 hours.

Next, the four-neck flask was cooled with stirring. After cooling, 100.0 parts by mass of dipentaerythritol hexaacrylate, 85.7 parts by mass of ditrimethylolpropane tetraacrylate, and 8.7 parts by mass of triethylamine were added, and 524 parts by mass of ion-exchanged water was added dropwise thereto.

Next, 10.9 parts by mass of a 10 mass % aqueous solution of piperazine, which served as a chain extender, was added to the four-neck flask and reacted, and thereafter solvent removal was carried out under reduced pressure. Thus, a urethane resin composition (11) having a non-volatile content of 35 mass % was obtained.

Comparative Example 1: Preparation of Urethane Resin Composition (C1))

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polycarbonate polyol (polycarbonate polyol obtained by reacting 1,6-hexanediol and 1,5-pentanediol with diethyl carbonate, number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 10 parts by mass of dipentaerythritol hexaacrylate and 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (C1) having a non-volatile content of 35 mass % was obtained.

Comparative Example 2: Preparation of Urethane Resin Composition (C2)

In a 2-L four-neck flask equipped with a heater, a stirrer, a thermometer, and a reflux condenser were placed 61.5 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 43.4 parts by mass of a polycarbonate polyol (polycarbonate polyol obtained by reacting 1,6-hexanediol and 1,5-pentanediol with diethyl carbonate, number average molecular weight of 2000), 0.04 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 36.8 parts by mass of dicyclohexylmethane diisocyanate was added to the four-neck flask and reacted at 80° C. for approximately 2 hours. Thereafter, 7.7 parts by mass of 2,2-dimethylolpropionic acid and 5.1 parts by mass of methyl ethyl ketone were added. These were reacted at 80° C. for approximately 5 hours.

Next, 800 parts by mass of methyl ethyl ketone was added to the four-neck flask, and this was cooled. After cooling, 900.0 parts by mass of dipentaerythritol hexaacrylate and 8.7 parts by mass of triethylamine were added.

Next, 21.5 parts by mass of a 10 mass % aqueous solution of isophoronediamine, which served as a chain extender, was added to the four-neck flask and reacted. Thus, a urethane resin composition (C2) having a non-volatile content of 25 mass % was obtained.

Comparative Example 3: Preparation of Urethane Resin Composition (C3)

In a 2-L four-neck flask equipped with a heater, a stirrer, a thermometer, and a reflux condenser were placed 23.7 parts by mass of methyl ethyl ketone, 12.1 parts by mass of 1,4-bis(3-acryloyloxy-2-hydroxyproxy)butane (in general formula (2), $R^1$ has two carbon atoms, $R^2$ has four carbon atoms, $R^3$ has two carbon atoms, and there are two functional groups containing a polymerizable unsaturated group), 38.6 parts by mass of a polycarbonate polyol (polycarbonate polyol obtained by reacting 1,6-hexanediol and 1,5-pentanediol with diethyl carbonate, number average molecular weight of 2000), 3.9 parts by mass of 1,6-hexanediol, 0.0024 parts by mass of methylhydroquinone, and 0.0242 parts by mass of 2,6-tert-butyl-p-cresol. This was adjusted at 50° C. with stirring.

Next, 40.3 parts by mass of dicyclohexylmethane diisocyanate was added to the four-neck flask and reacted at 80° C. for approximately 2 hours. Thereafter, 5.0 parts by mass of 2,2-dimethylolpropionic acid and 15.1 parts by mass of methyl ethyl ketone were added. These were reacted at 80° C. for approximately 5 hours.

Next, 27.8 parts by mass of methyl ethyl ketone was added to the four-neck flask, and this was cooled. After cooling, 3.8 parts by mass of triethylamine were added, and 410 parts by mass of ion-exchanged water was added dropwise thereto.

Next, 11.9 parts by mass of a 10 mass % aqueous solution of piperazine, which served as a chain extender, was added to the four-neck flask and reacted, and thereafter solvent removal was carried out under reduced pressure. Thus, a urethane resin composition (C3) having a non-volatile content of 35 mass % was obtained.

The following evaluations were conducted by using the urethane resin compositions obtained in the examples and the comparative examples described above.

Method for Evaluating Hardness of Coating Film

A photopolymerization initiator (mixture of 1-hydroxycyclohexyl phenyl ketone and benzophenone) was mixed in an amount of 4 parts by mass per 100 parts by mass of the urethane resin present in each of the urethane resin compositions obtained in the examples and the comparative examples. The urethane resin compositions were each coated onto a surface of a glass substrate to a film thickness of 10 μm. The coated object was dried at 140° C. for 5 minutes and was then irradiated with UV radiation at a dose of 400 mJ/cm$^2$ in two passes by using a high-pressure mercury lamp (manufactured by GS Yuasa Corporation). Thus, an article having a coating film layered on the surface of the glass substrate was obtained.

The hardness of the coating film, which was a constituent of the article, was measured using a method in accordance with the JIS test method (JIS K5600-5-4:1999), Scratch hardness (Pencil method).

Method for Evaluating Scratch Resistance

A photopolymerization initiator (mixture of 1-hydroxycyclohexyl phenyl ketone and benzophenone) was mixed in an amount of 4 parts by mass per 100 parts by mass of the urethane resin present in each of the urethane resin compositions obtained in the examples and the comparative examples. The urethane resin compositions were each coated onto a surface of a glass substrate to a film thickness of 10 μm. The coated object was dried at 140° C. for 5 minutes and was then irradiated with UV radiation at a dose of 500 mJ/cm$^2$ in one pass by using a high-pressure mercury lamp (manufactured by GS Yuasa Corporation). Thus, an article having a coating film layered on the surface of the glass substrate was obtained.

A steel wool resistance test was conducted in which the surface of the hard coat layer was rubbed with #0000 steel wool 100 times in a reciprocating manner at a speed of 200 mm/sec while a load of 500 g/3 cm$^2$ was applied. The haze difference (ΔH) between hazes before and after the steel wool resistance test was measured, and evaluations were made in accordance with the evaluation criteria below.

Excellent: the haze difference (ΔH) between hazes before and after the steel wool resistance test was less than 3.

Good: the haze difference (ΔH) between hazes before and after the steel wool resistance test was 3 or more and less than 8.

Fair: the haze difference (ΔH) between hazes before and after the steel wool resistance test was 8 or more and less than 10.

Poor: the haze difference (ΔH) between hazes before and after the steel wool resistance test was 10 or more.

Method for Evaluating Flexibility of Coating Film

A photopolymerization initiator (mixture of 1-hydroxycyclohexyl phenyl ketone and benzophenone) was mixed in an amount of 4 parts by mass per 100 parts by mass of the urethane resin present in each of the urethane resin compositions obtained in the examples and the comparative examples. The urethane resin compositions were each coated onto a surface of a PET film (150 μm) to a film thickness of 10 μm. The coated object was dried at 100° C. for 30 minutes and was then irradiated with UV radiation at a dose of 400 mJ/cm$^2$ in two pass by using a high-pressure mercury lamp (manufactured by GS Yuasa Corporation). Thus, an article having a coating film layered on the surface of the PET film was obtained.

The flexibility of the coating film, which was a constituent of the article, was evaluated based on the results of measurement according to the JIS K5600-5-1 bend test method (mandrel diameter: 2 mm). The evaluations were made in accordance with the evaluation criteria below.

Good: No cracking, wrinkling, or blushing was observed in the bent portion of the coating film.

Fair: Slight cracks or white striped wrinkles in the coating film were observed in the bent portion of the coating film.

Poor: Significant cracks in the coating film were observed over the entire bent portion of the coating film.

Table 1 shows the chemical composition of each of the urethane resin compositions (1) to (11), produced in Examples 1 to 11, and the results of the evaluation.

TABLE 1

|  |  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Urethane resin composition |  |  | (1) | (2) | (3) | (4) | (5) | (6) | (7) | (8) | (9) | (10) | (11) |
| Urethane resin | Polycarbonate polyol | Parts by mass | 38.6 |  |  | 43.4 | 43.4 | 38.6 | 43.4 | 47.8 | 38.6 | 21.7 | 43.4 |
|  | Polyester polyol |  |  | 38.6 |  |  |  |  |  |  |  |  |  |
|  | Polytetramethylene ether glycol |  |  |  | 38.6 |  |  |  |  |  |  | 21.7 |  |

TABLE 1-continued

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
|  | Pentaerythritol diacrylate |  |  |  |  |  |  |  | 8.2 |  |  |  |
|  | 1,4-bis (3-acryloyloxy-2-hydroxyproxy) butane | 12.1 | 12.1 | 12.1 | 12.1 | 12.1 | 12.1 | 12.1 |  | 12.1 | 12.1 | 12.1 |
|  | 1,6-hexanediol | 3.9 | 3.9 | 3.9 | 0.04 | 0.04 | 3.9 | 0.04 | 2.2 | 3.9 | 0.04 | 0.04 |
|  | 2,2-dimethylolpropionic acid | 5 | 5 | 5 | 7.7 | 7.7 | 5 | 7.7 | 5 | 5 | 7.7 | 7.7 |
|  | Dicyclohexylmethane diisocyanate | 40.3 | 40.3 | 40.3 | 36.8 | 36.8 | 40.3 | 36.8 | 36.8 | 40.3 | 36.8 | 36.8 |
| Multi-functional acrylate | Dipentaerythritol hexaacrylate | 50 | 50 | 50 | 185.7 | 233.3 |  |  | 50 | 30 | 185.7 | 100 |
|  | Ditrimethylolpropane tetraacrylate |  |  |  |  |  | 50 |  |  |  |  | 85.7 |
|  | Trimethylolpropane EO-modified triacrylate |  |  |  |  |  |  | 60 |  |  |  |  |
| Solvent |  | Water | Water | Water | MEK | Water | Water | Water | Water | Water | Water | Water |
| Content of polymerizable unsaturated bond groups in total of urethane resin and multifunctional acrylate [mmol/g] |  | 3.9 | 3.9 | 3.9 | 6.4 | 7.4 | 3.3 | 3.1 | 3.9 | 3.0 | 6.4 | 6.6 |
| [Multifunctional acrylate/urethane resin] |  | 0.5 | 0.5 | 0.5 | 1.9 | 2.3 | 0.5 | 0.6 | 0.5 | 0.3 | 1.9 | 1.9 |
| Hardness of coating film |  | 2H | 2H | 2H | 3H-4H | 4H | 2H | H-2H | 2H | H-2H | 3H-4H | 4H |
| Scratch resistance |  | Good | Good | Good | Excellent | Excellent | Good | Good | Good | Fair | Excellent | Excellent |
| Flexibility |  | Good | Good | Good | Good | Good | Good | Good | Good | Good | Good | Good |

Table 2 shows the chemical composition of each of the urethane resin compositions (C1) to (C3), produced in Comparative Examples 1 to 3, and the results of the evaluation.

TABLE 2

|  |  |  | Comparative Example 1 | Comparative Example 2 | Comparative Example 3 |
|---|---|---|---|---|---|
| Urethane resin composition |  |  | (C1) | (C2) | (C3) |
| Urethane resin | Polycarbonate polyol | Parts by mass | 38.6 | 43.4 | 38.6 |
|  | 1,4-bis (3-acryloyloxy-2-hydroxyproxy) butane |  | 12.1 | 12.1 | 12.1 |
|  | 1,6-hexanediol |  | 3.9 | 0.04 | 3.9 |
|  | 2,2-dimethylolpropionic acid |  | 5 | 7.7 | 5 |
|  | Dicyclohexylmethane diisocyanate |  | 40.3 | 36.8 | 40.3 |
| Multifunctional acrylate | Dipentaerythritol hexaacrylate |  | 10 | 900 |  |
| Solvent |  |  | Water | MEK | Water |
| Content of polymerizable unsaturated bond groups in total of urethane resin and multifunctional acrylate [mmol/g] |  |  | 1.6 | 9.8 | 0.7 |
| [Multifunctional acrylate/urethane resin] |  |  | 0.1 | 9.0 | 0 |
| Hardness of coating film |  |  | H | 4H | F |
| Scratch resistance |  |  | Poor | Excellent | Poor |
| Flexibility |  |  | Good | Poor | Good |

"MEK" in Tables 1 and 2 denotes methyl ethyl ketone.

Examples 1 to 11, shown in Table 1, are examples in which a urethane resin composition of the present invention was used. From the results of the evaluation of Examples 1 to 11, it was observed that the coating films each formed from a urethane resin composition of the present invention had excellent hardness and had excellent scratch resistance and flexibility.

On the other hand, Comparative Example 1, shown in Table 2, is an example in which the content of polymerizable unsaturated bond groups in the total of the urethane resin and the multifunctional acrylate was 1.6 mmol/g and thus the urethane resin composition used fell outside of the range of the present invention. It was observed that the coating film formed from the urethane resin composition of Comparative Example 1 had excellent flexibility but had significantly insufficient scratch resistance.

Comparative Example 2 is an example in which the content of polymerizable unsaturated bond groups in the total of the urethane resin and the multifunctional acrylate was 9.8 mmol/g and thus the urethane resin composition used fell outside of the range of the present invention. It was observed that the coating film formed from the urethane resin composition of Comparative Example 2 had excellent hardness and scratch resistance but had significantly insufficient flexibility.

Comparative Example 3 is an example in which a urethane resin composition containing no multifunctional acrylate was used. It was observed that the coating film formed from the urethane resin composition of Comparative Example 3 had excellent flexibility but had significantly insufficient hardness and scratch resistance.

The invention claimed is:

1. A urethane resin composition comprising:
a urethane resin (A) comprising a reaction product of a polyol (a1), a second polyol, and a polyisocyanate (a2), the polyol (a1) including an alkylene diol (a1-1) having two or more polymerizable unsaturated groups and represented by general formula (1) below or an oxyalkylene diol (a1-2) having two or more polymerizable unsaturated groups and represented by general formula (2) below, the second polyol having a hydrophilic group and the hydrophilic group being an anionic group, a cationic group or a nonionic group;

a multifunctional acrylate (B); and a solvent (C), wherein a proportion of polymerizable unsaturated bonds in a total of the urethane resin (A) and the multifunctional acrylate (B) is within a range of 2.5 to 9.5 mmol/g, and wherein a mass ratio of the multifunctional acrylate (B) to the urethane resin (A) is within a range of 0.5 to 4,

[Chem. 1]

$$HO-R^1-OH \quad (1)$$

where $R^1$ is a structure in which two or more functional groups containing a polymerizable unsaturated group are present in side chains of a linear alkylene group having one to nine carbon atoms,

[Chem. 2]

$$HO-R^1O-R^2-OR^3-OH \quad (2)$$

where $R^1$ and $R^3$ are each a structure in which a functional group containing a polymerizable unsaturated group is present in a side chain of an ethylene group, and $R^2$ is an alkylene group having 1 to 5 carbon atoms.

2. The urethane resin composition according to claim 1, wherein a proportion of polymerizable unsaturated bonds in the multifunctional acrylate (B) is within a range of 4 to 12 mmol/g.

3. A coating agent comprising the urethane resin composition according to claim 1.

4. An article comprising a coating film formed from the coating agent according to claim 3.

5. The urethane resin composition according to claim 1, wherein the hydrophilic group ranges from 1 mass % to 20 mass % of a total amount of the polyol (a1), the second polyol, and the polyisocyanate (a2).

6. The urethane resin composition according to claim 1, wherein the hydrophilic group ranges from 1 mass % to 15 mass % of a total amount of the polyol (a1), the second polyol, and the polyisocyanate (a2).

7. The urethane resin composition according to claim 1, wherein an equivalent ratio of isocyanate groups of the polyisocyanate (a2) to hydroxyl groups of the polyol (a1) is in a range of 0.8 to 2.5.

8. The urethane resin composition according to claim 1, wherein an equivalent ratio of isocyanate groups of the polyisocyanate (a2) to hydroxyl groups of the polyol (a1) is in a range of 0.9 to 1.5.

9. The urethane resin composition according to claim 1, wherein a weight average molecular weight of the urethane resin (A) ranges from 10,000 to 500,000.

10. The urethane resin composition according to claim 1, wherein a weight average molecular weight of the urethane resin (A) ranges from 20,000 to 200,000.

11. The urethane resin composition according to claim 1, wherein a weight average molecular weight of the urethane resin (A) ranges from 40,000 to 100,000.

12. The urethane resin composition according to claim 1, wherein the urethane resin (A) and the multifunctional acrylate (B) ranges from 5 mass % to 85 mass % of a total amount of the urethane resin composition.

13. The urethane resin composition according to claim 1, wherein the urethane resin (A) and the multifunctional acrylate (B) ranges from 15 mass % to 50 mass % of a total amount of the urethane resin composition.

14. The urethane resin composition according to claim 1, wherein the solvent (C) ranges from 10 mass % to 90 mass % of a total amount of the urethane resin composition.

15. The urethane resin composition according to claim 1, wherein the solvent (C) ranges from 45 mass % to 80 mass % of a total amount of the urethane resin composition.

* * * * *